Oct. 11, 1927.

J. E. WALKER 1,645,268

SEGMENTAL FLY WHEEL GEAR

Filed Aug. 3, 1926

Inventor

JEROME E. WALKER,

By

Attorney

Patented Oct. 11, 1927.

1,645,268

UNITED STATES PATENT OFFICE.

JEROME E. WALKER, OF SPARTANBURG, SOUTH CAROLINA.

SEGMENTAL FLYWHEEL GEAR.

Application filed August 3, 1926. Serial No. 126,839.

My invention relates to improvements in segmental fly wheel gears.

As is well known, the average automobile has its fly wheel enclosed within a case. This fly wheel is ordinarily equipped with a continuous ring-gear which is securely held thereon. When the gear teeth of the ring-gear strip, which frequently occurs due to the action of the starter gear, it is necessary to remove the end of the fly wheel case, and bodily remove the entire ring-gear, for the purpose of replacement. This operation is time consuming and expensive.

I am aware of the fact that attempts have heretofore been made to form a fly wheel ring-gear in segments, but the arrangement of the parts is such that these segments can not be removed for replacement, without the removal of the end of the fly wheel case.

The ordinary fly wheel case is provided in its bottom with a relatively small opening, whereby access may be had to the fly wheel and this opening is covered by a detachable plate.

In accordance with my invention, I construct a ring-gear in segments, and securely mount the same upon the periphery of the fly wheel in a manner whereby they may be removed from such periphery by an outward radial movement, and not requiring a movement longitudinally of the fly wheel. The segments are made in relatively short lengths so that they may be passed through the opening in the bottom of the fly wheel case. By this means, should some of the teeth become stripped, the fly wheel is turned until the stripped segment is brought adjacent to the opening, at which time such segment may be withdrawn through the opening.

Figure 1:
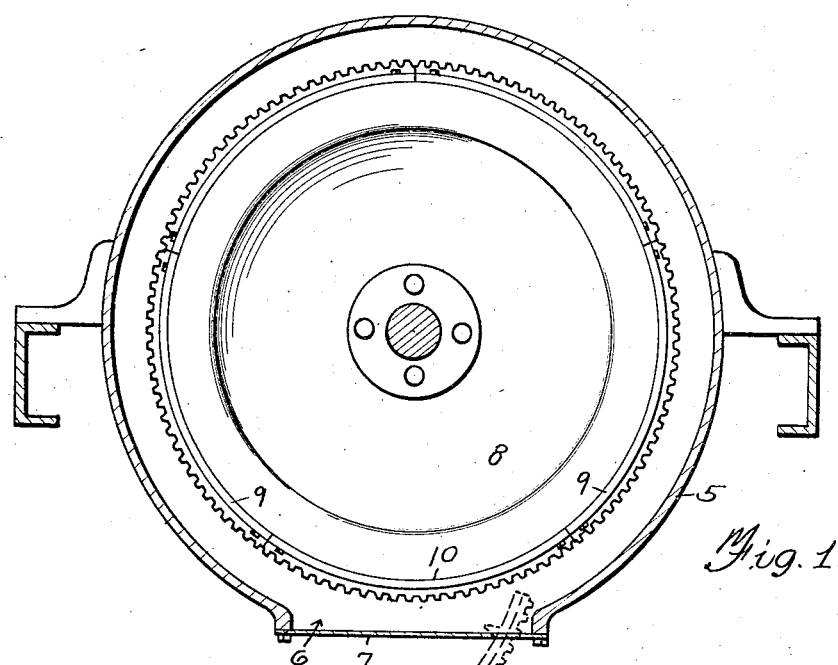
Figure 2:
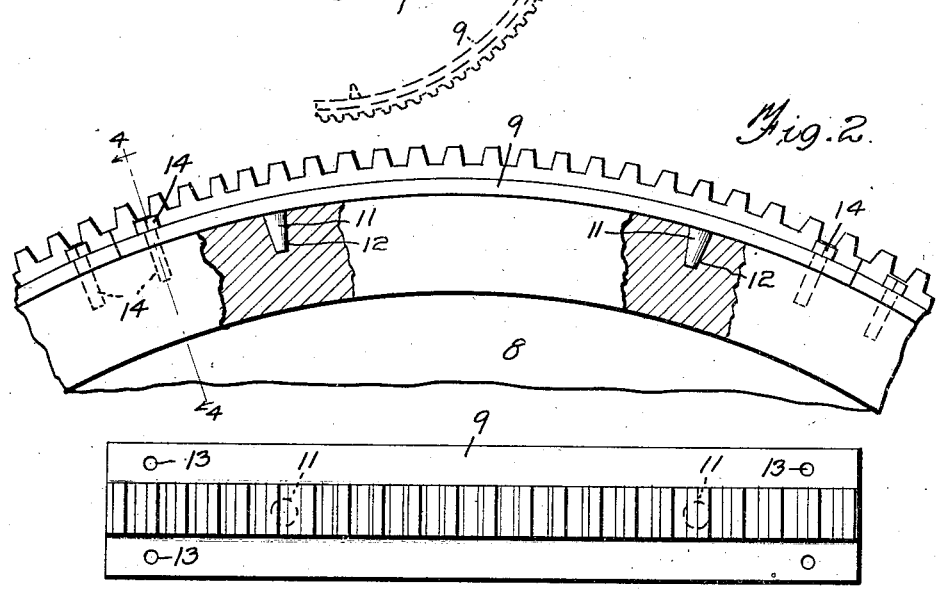
Figure 3:
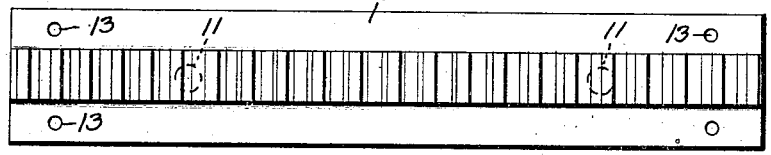
Figure 4:
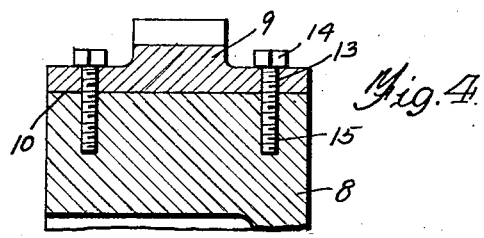

In the accompanying drawings, forming a part of this specification, and in which like numerals are employed to designate like parts throughout the same, Figure 1 is a transverse vertical section through a fly wheel case, showing the fly wheel and my improved ring-gear in elevation, Figure 2 is an edge elevation of a plurality of the segments of the ring-gear, parts broken away, Figure 3 is a plan view of the segment, and Figure 4 is a transverse section taken on line 4—4 of Figure 2.

In the drawings, wherein for the purpose of illustration, is shown a preferred embodiment of my invention, the numeral 5 designates the fly wheel case, provided in its bottom with the usual opening 6, covered by a detachable plate 7. The numeral 8 designates the fly wheel, within the fly wheel case.

My improved ring-gear embodies a plurality of relatively short gear segments 9, which are adapted to be assembled upon the periphery 10 of the fly wheel. Each gear segment 9 is provided with inwardly projecting radial lugs 11 preferably integral therewith. These lugs are tapered inwardly and are adapted for insertion within radial recesses or pockets 12, formed in the periphery of the fly wheel. The pockets 12 are correspondingly tapered inwardly. By the arrangement of the lugs 11 and the pockets or recesses 12, the gear segment may be removed from the periphery of the fly wheel by a true radial movement.

The gear segment 9 is provided upon opposite sides of its teeth with radial openings 13, for the reception of bolts 14, which are adapted to be screw-threaded into radial openings 15, formed in the periphery of the fly wheel 8.

In view of the foregoing description, it will be seen that the lugs 11 and bolts 14 provide a powerful connection between the gear segment and fly wheel, to prevent torsional displacement. By unscrewing the bolts 14, the gear segment may be readily separated from the fly wheel, by a true radial movement and will pass through the opening 6.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:—

1. The combination with a fly wheel case having a relatively small opening in its bottom, of a fly wheel within the case and having its periphery in substantial alinement with said opening, a ring-gear mounted upon the fly wheel, said ring-gear embodying a plurality of gear segments, each segment being made sufficiently short to permit the same to be removed through said opening, and means for detachably securing the gear segments to the fly wheel, said means extending radially in an outwardly direction to a point near the periphery of the ring-gear so that they may be readily accessible through said opening.

2. The combination with a fly wheel case having a relatively small opening in its periphery, of a fly wheel mounted within said case and having its periphery in substantial alinement with said opening, a ring-gear mounted upon the periphery of the fly wheel, said ring-gear embodying a plurality of gear segments which are formed suitably short to be removed through said opening, and attaching elements detachably securing the gear segments to the periphery of the fly wheel, said elements extending to a point near the periphery of the ring-gear and being accessible through said opening.

3. The combination with a fly wheel case provided in its periphery with an opening, of a fly wheel mounted within said case and having its periphery accessible through said opening, a ring-gear mounted upon the periphery of said fly wheel and embodying a plurality of separate gear segments which are sufficiently short to be removed through said opening, and bolts detachably connecting the gear segments with the fly wheel, the outer ends of said bolts extending to a point near the periphery of the ring-gear so that they are accessible through said opening.

4. The combination with a fly wheel case having a relatively short opening in its periphery, of a fly wheel within the case having its periphery in substantial alinement with said opening, said fly wheel having radial recesses formed in its periphery, a ring-gear mounted upon the periphery of the fly wheel and embodying a plurality of separate gear segments which are sufficiently short to be removed through said opening, radial lugs carried by the gear segments and extending inwardly beyond the same for insertion within the radial recesses, and radial bolts for detachably securing the gear segments to the periphery of the fly wheel and extending to a point near the periphery of the ring-gear so that their outer ends are accessible through said opening.

5. The combination with a fly wheel provided with a smooth peripheral face having tapered radial openings formed therein, of a ring-gear formed in a plurality of matched gear segments, tapered lugs carried by said gear segments for engagement within said tapered openings, whereby said gear segments will partake of a true radial movement when being moved from said wheel, lateral flanges, formed upon said gear segments, and bolts for securing said flanges to the face of the fly wheel.

6. A fly wheel adapted to be arranged within a closed case having a relatively short opening formed in its periphery, the periphery of the fly wheel being readily accessible through said opening, a ring-gear mounted upon the periphery of the fly wheel and embodying a plurality of gear segments which are formed suitably short to be passed through said opening, and generally radial attaching elements detachably securing the gear segments to the periphery of the fly wheel, said attaching elements extending outwardly to a point near the periphery of the ring-gear whereby they are accessible through said opening.

In testimony whereof I affix my signature.

JEROME E. WALKER.